United States Patent Office 3,310,429
Patented Mar. 21, 1967

3,310,429
METHOD OF REPELLING WATER FROM A TRANSPARENT MEMBER
Keith Gunnar, Bellevue, Wash., and Robert S. Hansen, Ames, Iowa, assignors to The Boeing Company, Seattle, Wash., a corporation of Delaware
No Drawing. Filed Mar. 28, 1966, Ser. No. 537,666
12 Claims. (Cl. 117—124)

This application is a continuation-in-part of U.S. patent application Ser. No. 246,334, filed by the same applicants on Dec. 21, 1962, for "Method of Repelling Water From a Transparent Member" and now abandoned. U.S. patent application Ser. No. 246,334, now abandoned, was a continuation-in-part of the U.S. patent application Ser. No. 214,494, filed by the same applicants on Aug. 3, 1963, for "Method of Repelling Water From a Transparent Member," also abandoned.

This invention relates to the art of removing a liquid from the surface of a transparent member to improve the visibility therethrough. More particularly this invention relates to the art of removing rain or water spray from glass, such as aircraft or boat windshields, by rendering the glass water-repellent by the use of a particular chemical solution which may be applied upon the glass.

The technique of this invention has the outstanding practical advantage that it may be practiced, as on an airplane or boat, while the vehicle is in actual motion, and while the glass is already wet with rain or water spray, with the result that the glass, for example, a windshield, rapidly becomes water-repellent and visibility therethrough is immediately greatly improved.

This invention finds its most immediate application to aircraft windshields, where the need is most urgent. Many techniques have been tried to solve the problem of visibility in rainstorms, which problem is particularly pressing during take-offs or landing operations. Windshield wipers, for example, even when operated at several hundred strokes per minute, fail to give satisfactory results, simply because the rate of rain impingement is too high. A more recent and more successful scheme is the use of high velocity air jets to blow the water droplets off the windshield. Although this is a reasonably satisfactory system, its effectiveness, of course, is dependent upon the air pressure available. As a practical matter the air source in jet aircraft is the air compressor of one of the engines, so the pressure available depends upon the power setting of the engine, which varies with flight conditions. Obviously the power requirements of the aircraft have little relationship to the need for rain removal, with the result that the rain removal system may be largely ineffective at the very moment it is most needed.

Another system of rain removal, to which general class the present invention relates, is that of rendering the glass water-repellent. Numerous chemical compounds are water-repellent, and glass coated with such becomes hydrophobic. A windshield with an ultra-thin coating of a water-repellent substance upon its surface gives excellent visibility in rain. As the airstream passes over the windshield the rain drops are removed as fast as they impinge, so that no visibility impairing film of water drops develops. Prior to this invention, however, techniques for applying such ultra-thin coatings involved their application under quite exacting controlled conditions, and were time-consuming. The coating was applied while the airplane was on the ground, and, of course, out of service, and one of the simpler requirements in most cases was that the glass be dry at the time of application. With modern jet aircraft flight time being valued at $900 per hour, it is obviously highly desirable to reduce ground time. Furthermore, even though such an ultra-thin coating is successfully applied before a flight, the ultra-thin coating has a limited life, and may at the end of a flight be severely reduced in effectiveness, while visibility is desperately needed during approach and landing. These, and other factors have discouraged the practical use of such pre-applied coatings, and they are little used.

Thus, an object of this invention is to provide a means of effecting a hydrophobic coating of controlled molecular thickness to the surface of a transparent member.

Another object of this invention is to provide for effecting an optically clear coating of a water-repellent substance on donor sites of a surface of a transparent member without prior drying of said surface.

And another object of this invention is to provide for effecting an optically clear coating of a water-repellent substance on a surface of a transparent member by subjecting such surface to impingement of water droplets and a solution including a solvent and a solute of a water-repellent substance.

Still another object of this invention is to provide for effecting an ultra-thin water-repellent coating on the surface of a transparent member while the surface of the member is being subjected to impinging liquid, so as to effect good visibility through the member.

And still another object of this invention is to provide for effecting, in or during rain, from time to time, continually as the need arises, an ultra-thin coating of a water-repellent substance contained in solution upon donor sites of a surface of a transparent member.

Yet another object of this invention is to provide a cationic quaternary ammonium compound suitable as a solute for effecting a hydrophobic coating upon donor sites of a surface of a transparent member.

And yet another object of this invention is to provide a water-activated chromium carboxylic (myristic) acid complex suitable as a solute for effecting a hydrophobic coating upon donor sites of a surface of a transparent member.

Other objects and advantages will become apparent from the following description.

For this invention "aliphatic" is defined as of, pertinent to, or derived from, fat, including, but not limited to, fatty acids and other derivatives of the paraffin and olefin hydrocarbons.

The use in the present specifications and claims of the word: "polyoxyalkylene" is intended to be the full equivalent of "polyoxypolyalkylene."

The isopropyl alcohol referred to in this application is 99% pure, unless otherwise stated.

For this invention, a donor site is defined as a site on a surface, such as on a glass surface, said site being a position available for acceptance of a water-repellent substance, especially such as an anionic charge site, and also such as a hydrogen bond site or an acidic site.

A group of quaternary ammonium compounds each of which is cationic in solution and each of which is suitable as a solute, in accordance with the teachings of this invention, for effecting a hydrophobic coating upon donor sites of a surface of a transparent member is discovered to be characterized by the following general formula:

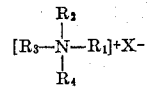

wherein $R_1$ represents an aliphatic radical of from 12 to 22 carbon atoms, inclusive, e.g., dodecyl, tetradecyl, hexadecyl, octadecyl, etc., and the like; $R_2$ represents either a methyl radical, $CH_3$, or an aliphatic radical from 12 to 22 carbon atoms, inclusive, and the like; $R_3$ represents either a methyl radical or

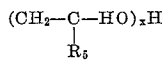

and the like; $R_4$ represents a methyl radical or

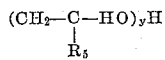

and the like; $x$ represents a certain number, $y$ represents a certain number, the sum of $x$ and $y$ is 2 to 15, inclusive; $R_5$ represents H or a methyl radical, and the like; X represents an anion such as chloride, bromide, or iodide, or hydroxide, or bisulfate, nitrate, nitrite, acetate, lactate, methosulfate, ethosulfate, and the like.

The reader skilled in the art will readily recognize that the aliphatic radicals represents by $R_1$ and $R_2$ in the foregoing general formula comprise carbon chains of from 12 o 22 carbons, inclusive, in which the even-numbered carbon chains, e.g., dodecyl, tetradecyl, hexadecyl, octadecyl, etc., are derived from natural-occurring fats, while the odd-numbered carbon chains, e.g., tridecyl, pentadecyl, etc., are derived from synthetic sources. The term "coco" as referred to herein indicates a derivation from the natural-occurring fatty acids of the coconut. The term "tallow" indicates that the chemical substance is derived from the natural-occurring fatty acids of tallow.

A distinct advantage in using a quaternary ammonium compound selected from the group represented by the general formula as stated above is that the ammonium compound has the property of being water-soluble and/or water-dispersible. The molecule of each quaternary ammonium compound of this group contains a hydrophilic portion, which tends to increase solubility in water, and a hydrophobic portion, which tends to repel water. Surface activity and water solubility depend principally upon the number of carbon atoms in the alkylene group of the polyoxyalkylene unit, the number of carbon-chain length of the alkyl group or groups attached to the pentavalent nitrogen and the number of oxyalkylene units in the molecular structure of the compound.

Examples of chemical substances discovered to be suitable as solutes for this invention are:

EXAMPLE 1.—HEXADECYL TRIMETHYL AMMONIUM CHLORIDE

*Test results.*—When the concentrated solution was rubbed on glass little if any repellency resulted; however, when an aqueous solution having 1 to 2 grams of the aforementioned compound dissolved in water to a ratio of from 98 to 99 grams was applied to glass the surface became somewhat repellent. A rain tunnel was operated to simulate 125 knot air speed and 1.2 inches per hour rainfall. Using an existing "squirt" nozzle on the test cab section of an airplane windshield, a few milliliters of the said solution were squirted on the windshield in the rain. The area where the solution hit and a considerable portion of the rest of the window became immediately repellent, offering greatly improved vision as compared to the areas where windshield wipers were used. The vision gradually deteriorated and to keep satisfactory vision it was found necessary to reapply the solution at 30 second to two minute intervals.

EXAMPLE 2.—OCTADECYLPOLYOXYETHYLENE (15) METHYL AMMONIUM CHLORIDE

A solution having 10 grams of the above compound dissolved in each 90 grams of 99% isopropyl alcohol gave the following tests results:

Testing at simulated rain intensity of 1.6 inches of rain per hour and at simulated velocity of ninety knots with a conventional airplane windshield and wiper:

Good visibility was maintained by squirting the solution of Example 2, five milliliters at a time, onto the windshield. Testing followed consecutively without cleaning the windshield. Every other application—or squirt—was timed, as indicated in the following table.

(1) *Without wiper*

TIMES BETWEEN SQUIRTS

|  | Seconds |
|---|---|
| Between first and second squirt | 32 |
| Between third and fourth squirt | 42 |
| Between fifth and sixth squirt | 45 |
| Between seventh and eighth squirt | 27 |

(2) *With wiper*

TIMES BETWEEN SQUIRTS

|  | Seconds |
|---|---|
| Between first and second squirt | 66 |
| Between third and fourth squirt | 57 |
| Between fifth and sixth squirt | 48 |

After a total of 10 minutes and 14 seconds during which a total of 16 squirts were applied to the windshield there was no optically visible scum on the windshield in either the wiped or unwiped areas.

EXAMPLE 3

8.8 grams of "coco" polyoxypropylene (15) methyl ammonium methosulfate were dissolved in each 91.2 grams of 99% isopropyl alcohol.

*Test conditions.*—The solution was sprayed upon a mock-up of a Boeing 727 windshield under simulated conditions of heavy rainfall at a rate of 1.6 inches of water per hour at 90 knots. The water-repellent solution was applied in applications of approximately 5 milliliters each.

In tests lasting five minutes it was found that without windshield wipers in operation the average time elapsing between applications during which time the test windshield remained optically clear was 19 seconds. Under the same test conditions, except with the windshield wipers in operation, the average time lapse was 33 seconds

EXAMPLE 4

5 grams of octadecylpolyoxyethylene (15) methyl ammonium chloride were dissolved in each 95 grams of 99% isopropyl alcohol. Under the same test conditions as in Example 3 it was found that without the windshield wipers in operation the average time elapsing between applications during which time the windshield remained optically clear was 35 seconds. With the windshield wipers in operation the average time lapse was 40 seconds.

EXAMPLE 5

5 grams of octadecylpolyoxyethylene (15) methyl ammonium nitrate were dissolved in each 95 grams of 99% isopropyl alcohol. Under the same test conditions as in Example 3 it was found that without the windshield wipers in operation the average time elapsing between applications during which time the windshield remained optically clear was 31 seconds. With the windshield wipers in operation the average time lapse was 62 seconds.

EXAMPLE 6

10 grams of di-"coco" di-methyl ammonium hydroxide were dissolved in each 90 grams of 99% isopropyl alcohol. Under the same test conditions as in Example 3 it was found that without the windshield wipers in operation the average time elapsing between applications during which time the windshield remained optically clear was 31 seconds. With the windshield wipers in operation the average time lapse was 44 seconds.

EXAMPLE 7

6.4 grams of di-"tallow" di-methyl ammonium chloride were dissolved in each 93.6 grams of 99% isopropyl alcohol. Under the same test conditions as in Example 3 it was found that without the windshield wipers in operation the average time elapsing between applications during which time the windshield remained optically clear was 37 seconds. With the windshield wipers in operation the average time lapse was 32 seconds.

EXAMPLE 8

1 gram of dodecyl trimethyl ammonium chloride was dissolved in each 99 grams of 99% isopropyl alcohol. Under the same test conditions as in Example 3 it was found that without the windshield wipers in operation the average time elapsing between applications during which time the windshield remained optically clear was 16 seconds. With the windshield wipers in operation the average time lapse was 19 seconds.

EXAMPLE 9

5 grams of eicosyl-heneicosyl trimethyl ammonium chloride were dissolved in each 95 grams of 99% isopropyl alcohol. Under the same test conditions as in Example 3 it was found that without the windshield wipers in operation the average time elapsing between applications during which time the windshield remained optically clear was 49 seconds. With the windshield wipers in operation the average time lapse was 34 seconds.

EXAMPLE 10

1 gram of "coco" polyoxyethylene (2) methyl ammonium chloride was dissolved in each 99 grams of technical grade trichloroethylene. Under the same test conditions as in Example 3 it was found that without the windshield wipers in operation the average time elapsing between applications during which time the test windshield remained optically clear was 12 seconds. With the windshield wipers in operation the average time lapse was 20 seconds.

EXAMPLE 11

The following test results were obtained with a solution ($R_1$) having 0.25 gram of water-soluble chromium carboxylic (myristic) acid complex dissolved in each 101.0 grams of 99% isopropyl alcohol, and a wash ($S_1$) of a commercial liquid detergent in isopropyl alcohol.

The time in seconds indicates the time before the next application of water-repellent solution or wash required to maintain good visibility. Test conditions were the same as in Example 3.

(1) *Without windshield wipers in operation*

| Solution: | Time between applications in seconds |
|---|---|
| $R_1$ | 40 |
| $R_1$ | 45 |
| $R_1$ | 30 |
| $R_1$ | 20 |
| $R_1$ | 0 |
| $S_1$ | 15 |
| $S_1$ | 20 |
| $S_1$ | 15 |
| $S_1$ | 15 |
| $R_1$ | 40 |
| $R_1$ | 20 |
| $S_1$ | 15 |
| $S_1$ | 15 |
| $R_1$ | 20 |
| $R_1$ | 15 |
| $S_1$ | 20 |
| $S_1$ | 15 |
| $R_1$ | 15 |

(2) *With windshield wipers in operation*

| Solution: | Time between applications in seconds |
|---|---|
| $R_1$ | 20 |
| $S_1$ | 40 |
| $R_1$ | 30 |
| $S_1$ | 30 |
| $R_1$ | 30 |
| $S_1$ | 30 |
| $R_1$ | 25 |
| $S_1$ | 30 |
| $R_1$ | 35 |
| $S_1$ | 30 |
| $R_1$ | 65 |

EXAMPLE 12.—DI-POLYOXYETHYLENE STEARYL METHYL AMMONIUM CHLORIDE

A solution having 10 grams of the above compound in 100 milliliters of technical grade isopropyl alcohol gave the following test results:

Testing at simulated rain intensity of 1.6 inches of rain per hour and at simulated velocity of ninety knots with a conventional airplane windshield and wiper:

Good visibility was maintained by squirting the solution of Example 1, five milliliters at a time, onto the windshield according to the following table. Testing followed consecutively without cleaning the windshield.

(1) *Without wiper*

TIMES BETWEEN SQUIRTS

| | Seconds |
|---|---|
| Between first and second squirt | 32 |
| Between second and third squirt | 42 |
| Between third and fourth squirt | 45 |
| Between fourth and fifth squirt | 27 |

(2) *With wiper*

TIMES BETWEEN SQUIRTS

| Between first and second squirt | 66 |
|---|---|
| Between second and third squirt | 57 |
| Between third and fourth squirt | 48 |

After a total of 10 minutes and 14 seconds during which a total of 16 squirts were applied to the windshield there was no apparent film on the windshield in either the wiped or unwiped area.

The concentration of the water-repellent solute used in this invention should be such that the total weight of the solute in grams to the weight of the water-repellent solution in grams does not exceed twenty to one hundred.

In the foregoing examples the reader skilled in the art will readily observe that the water repellency of the test windshield is benefited, generally, by the stroking action of the windshield wipers, indicating the possibility of re-distributing, orienting or re-orienting monolayers of a water-repellent substance by stroking.

As for the solvent, the solvent used in this invention may be water, where the solute has a satisfactory solubility in water. Or the solvent may be alcohol; or alcohol and water; or 1,1,2-trichloro, 1,2,2,-trifluoroethane; or 1,1,2,2,-tetrachloro, 1,2-difluoroethane; or any other satisfactory solvent, depending upon the circumstances of application and the nature of the material to which application is to be made.

It is emphasized that the quantity of each chemical substance indicated in the foregoing examples, particularly the solutes therein, is that quantity of the commercial product—usually marketed under a corresponding trade name—discovered to be suitable for this invention.

In accordance with the present invention the desired solution of the above-described solute is applied to the surface of the material to be coated by any suitable means, including spraying, rubbing on, using an absorbent applicator, seepage, splashing, or by any other convenient method. Therewith, the aforesaid surface is impinged with a liquid, such as water.

This invention has particular application to providing for maintaining visibility by rendering glass windshields of in-flight aircraft rain-repellent by means of effecting a hydrophobic coating thereon. In such an application a solution of the water-repellent substance may be stored in a suitable container aboard the aircraft. The storage container for the rain-repellent solution may be connected by appropriate tubing to a nozzle fashioned to deliver a spray of the solution upon the windshield. During a rain in which the visibility of the pilot is obscured or threatened, the pilot at his discretion, may spray the water-repellent solution upon the windshield. The applied solution is impinged by the oncoming rain droplets, whereby the solution is distributed across the windshield and an ultra-thin coating is effected. Thus, the windshield is simultaneously subjected to the impingement of the water droplets and the application of the solution.

A thin coating of the water-repellent substance is desired since a layer many molecules thick appears to have considerably less rain-repellency than a thin layer. The thin hydrophobic coating effected has a unique advantage in that the coating achieved does not materially reflect or refract light passing through the coating, so that vision through a transparent material made water repellent by this method is not obscured by the coating itself. Another advantage in the use of the method of this invention is that a prior drying of the receiving surface is not required. Still another advantage is that the water-repellent compound affords attraction to surface donor sites, even in the presence of water.

It is emphasized that simultaneous impingement of water droplets on the receiving surface is not necessary for effecting the hydrophobic coating. Such a coating will develop from an applied solution of one of the water-repellent substances referred to herein without simultaneous impingement of water droplets on the receiving surface. Further, if the said water-repellent solution is sufficiently dilute, which is difficult to control, the hydrophobic coating effected will be ultra-thin and water-repellent without washing or impingement with water. What is critical is that such a hydrophobic coating is formed even while water droplets are simultaneously impinging during the process, and that the water droplets, whether or not simultaneously applied, have indeed a beneficial effect in washing off excessive molecular layers of the water-repellent substance which may form by virtue of high solution concentration and which would otherwise tend to destroy the water repellency.

There are indications that on dry glass (glass the surface of which is devoid of water in either liquid or vapor form) the ionic charge on the surface is probably random, being perhaps anionic and cationic at certain sites. In the absence of optically visible water, the charge on a glass surface probably depends upon electrostatic forces or upon atmospherically adsorbed moisture. When water reaches a glass surface, either as a liquid or as atmospheric moisture, the surface charge apparently becomes anionic due to water adsorption and hydrolysis to form —OH groups on the surface. This theory explains the particular usefulness of this invention in the presence of rain.

From the above description it can be seen that in accordance with the teachings of this invention there is provided a method of effecting a hydrophobic coating to such surfaces as windshields of vehicles while in motion, including, but not limited to, air-borne vehicles. Other vehicles upon which this invention may be advantageously practiced include high speed boats, for the removal of rain and water spray; and re-entry vehicles, in which, because of power limitations, this invention would be especially valuable. Thus, certain water-repellent substances of limited durability may be used while in flight or in motion, and used repetitiously as the need arises. Therefore, the disadvantage of pre-applied hydrophobic coatings which may be eroded away in flight or in motion by rain, hail, sleet, or ice crystals, or dust, sand or air is overcome by this invention.

It is to be understood that the above description is for the purpose of illustration and not by way of limitation and that changes and modifications may be made therein without departing from the spirit and scope of the invention.

Having thus described our invention, what we desire to protect by Letters Patent is:

1. A method of effecting an optically clear coating of a water-repellent substance on a surface of a transparent member, comprising subjecting such surface to an application of a solution which includes a solvent and a solute selected from the group represented by the general formula:

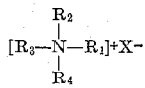

wherein $R_1$ represents an aliphatic radical of from 12 to 22 carbon atoms, inclusive; $R_2$ represents a radical of the class consisting of methyl and aliphatic radicals, the latter comprising 12 to 22 carbon atoms, inclusive; $R_3$ represents a radical of the class consisting of methyl and

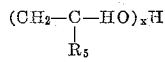

radicals; $R_4$ represents a radical of the class consisting of methyl and

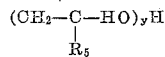

radicals; $x$ and $y$ each represents a certain number, the sum of which is 2 to 15, inclusive; $R_5$ represents a radical consisting of the class of H and methyl radicals; X represents an anion; and thereafter impinging said surface with water droplets.

2. A method of effecting an ultra-thin hydrophobic coating on a surface of a transparent member, comprising simultaneously subjecting such surface to impingement of water droplets and a solution which includes a solvent and a solute selected from the group represented by the general formula:

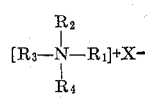

wherein $R_1$ represents an aliphatic radical of from 12 to 22 carbon atoms, inclusive; $R_2$ represents a radical of the class consisting of methyl and aliphatic radicals, the latter comprising 12 to 22 carbon atoms, inclusive; $R_3$ represents a radical of the class consisting of methyl and

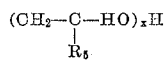

radicals; $R_4$ represents a radical of the class consisting of methyl and

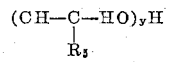

radicals; $x$ and $y$ each represents a certain number the sum of which is 2 to 15, inclusive; $R_5$ represents a radical consisting of the class of H and methyl radicals; X represents an anion.

3. A method of effecting an optically clear coating of a water-repellent substance on a surface of a transparent member comprising subjecting such surface to an application of a solution which includes a water-soluble chromium carboxylic (myristic) acid complex, as the solute, dissolved in isopropyl alcohol and thereafter impinging said surface with water droplets.

4. The method as in claim 3 in which the weight of the solute in grams to the weight of the solution in grams does not exceed twenty to one hundred.

5. A method of effecting an ultra-thin coating of a water-repellent substance on a surface of a transparent member, comprising simultaneously subjecting such surface to impingement of water droplets and a solution which includes isopropyl alcohol as a solvent and water-soluble chromium carboxylic (myristic) acid complex, as the solute.

6. The method as in claim 5 in which the weight of the solute in grams to the weight of the solution in grams does not exceed twenty to one hundred.

7. A method of effecting an ultra-thin coating of a hydrophobic composition on a surface of a transparent member comprising the steps of:
(a) subjecting the surface to impingement by water droplets;
(b) subjecting the surface, simultaneously with step (a), to impingement by a solution comprising:
(1) 100 milliliters of a solvent;
(2) one to 15 grams of di-polyoxyethylene stearyl methyl ammonium chloride.

8. A method of effecting an ultra-thin coating of a hydrophobic composition on a surface of a transparent member comprising the steps of:
(a) subjecting the surface to impingement by water droplets;
(b) subjecting the surface, simultaneously with step (a), to impingement by a solution comprising:
(1) 100 milliliters of isopropyl alcohol;
(2) one to 15 grams of di-polyoxyethylene stearyl methyl ammonium chloride.

9. The method of claim 1 wherein $R_3$ is the radical $$(CH_2-C-HO)_xH$$
$$\quad\quad | \quad\quad$$
$$\quad\quad R_5 \quad\quad$$

and $R_4$ is the radical $$(CH_2-C-HO)_yH$$
$$\quad\quad | \quad\quad$$
$$\quad\quad R_5 \quad\quad$$

10. The method of claim 1 wherein the solute is di-polyoxyethylene stearyl methyl ammonium chloride.

11. The method of claim 2 wherein $R_3$ is the radical $$(CH_2-C-HO)_xH$$
$$\quad\quad | \quad\quad$$
$$\quad\quad R_5 \quad\quad$$

and $R_4$ is the radical $$(CH_2-C-HO)_yH$$
$$\quad\quad | \quad\quad$$
$$\quad\quad R_5 \quad\quad$$

12. The method of claim 2 wherein the solute is di-polyoxyethylene stearyl methyl ammonium chloride.

References Cited by the Examiner
UNITED STATES PATENTS

| | | | |
|---|---|---|---|
| 1,502,821 | 7/1924 | Harrington | 239—284 |
| 2,273,040 | 2/1942 | Iler | 117—124 |
| 2,314,111 | 3/1943 | Tucker et al. | 260—567.6 |
| 2,356,542 | 8/1944 | Sloan | 117—124 |
| 2,544,667 | 3/1951 | Goebel et al. | 117—124 |
| 2,982,672 | 5/1961 | Santelli | 117—124 |
| 3,028,301 | 4/1962 | Winicov | 260—567.6 |
| 3,048,265 | 8/1962 | Hackhel et al. | 106—13 |
| 3,123,641 | 3/1964 | Longley | 260—567.6 |

ALFRED L. LEAVITT, *Primary Examiner.*
W. L. SOFFIAN, A. H. ROSENSTEIN,
*Assistant Examiners.*